M. V. B. ETHRIDGE,

Assignor, by mesne assignments, to G. W. COPELAND.

Machine for Finishing Boot-Legs.

No. 9,098. Reissued Feb. 24, 1880.

WITNESSES

Geo. F. Walker

M. W. Sawyer

INVENTOR

Martin V. B. Ethridge by his attys

Clarke & Raymond.

N. PETERS, PHOTO-LITHOGRAPHER, WASHINGTON, D. C.

UNITED STATES PATENT OFFICE.

MARTIN V. B. ETHRIDGE, OF BOSTON, ASSIGNOR, BY MESNE ASSIGNMENTS, TO GEORGE W. COPELAND, OF MALDEN, MASSACHUSETTS.

MACHINE FOR FINISHING BOOT-LEGS.

SPECIFICATION forming part of Reissued Letters Patent No. 9,098, dated February 24, 1880.

Original No. 211,623, dated January 28, 1879. Application for Reissue filed December 22, 1879.

*To all whom it may concern:*

Be it known that I, M. V. B. ETHRIDGE, of Boston, in the county of Suffolk and State of Massachusetts, have invented an Improvement in Machines for Fitting, Smoothing, and Finishing the Leg of a Boot on a Boot-Tree, of which the following is a specification.

This invention consists in a revolving smoothing and finishing tool provided with means for vertical, horizontal, and lateral adjustment in relation to a boot-tree; in means for operating said tool; in means for providing said tool with the adjustments above named, and in means for oscillating said tool.

Figure 1:
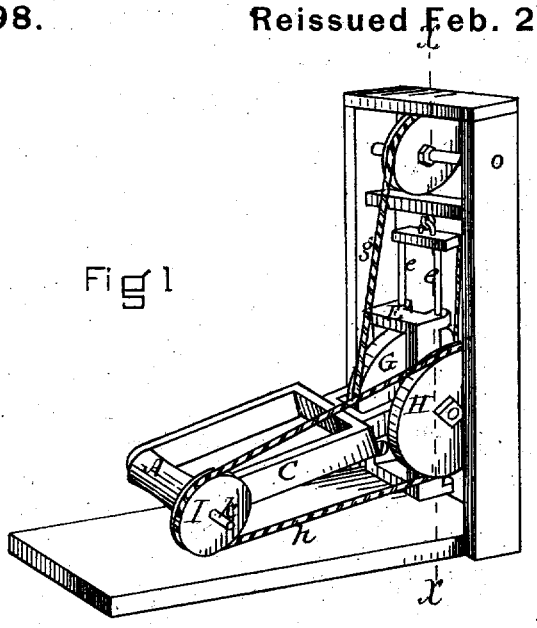
Figure 2:
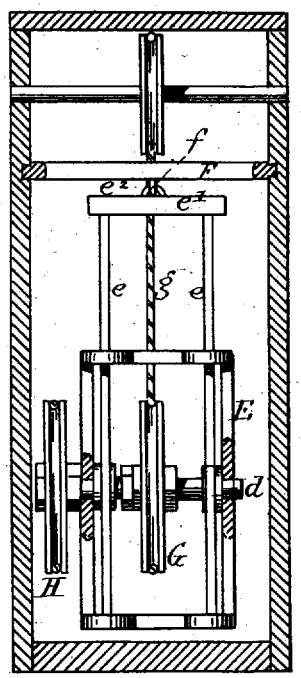
Figure 3:
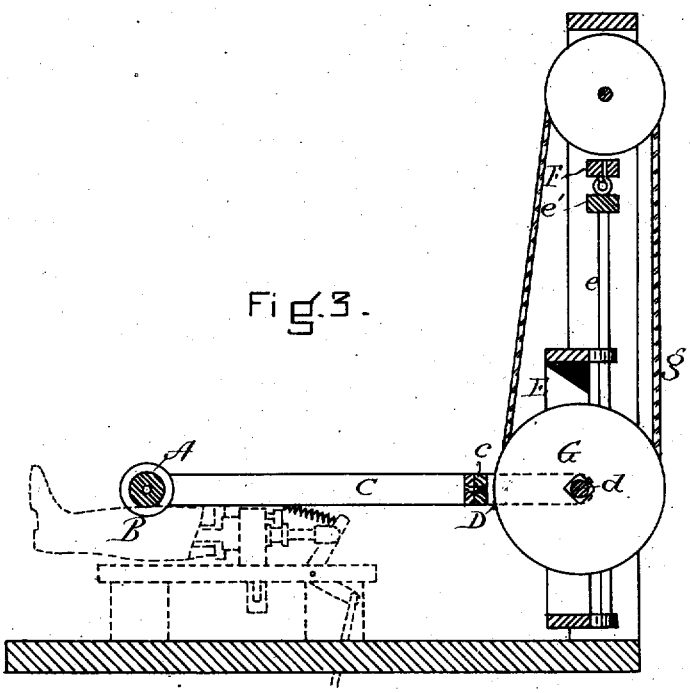

In the drawings, Figure 1 is a perspective view of the machine. Fig. 2 is a vertical section on the line *x x* of Fig. 1, and Fig. 3 is a vertical cross-section of the upright portion of Fig. 1.

Heretofore the work which my revolving smoothing and finishing tool accomplishes was done with a rub-stick of hard wood properly rounded on the surface contacting with the leg of the boot. With this tool, operated by hand, is was possible to smooth out the wrinkles, to perfectly fit the boot-leg to the tree, and to rub in the filling material used in finishing the leather; but it was a tedious operation, and very wearing on the strength of the workman performing it.

In my machine the boot is stretched in the ordinary way, so far as the insertion of the stretching-blocks is concerned, after which the stretching mechanism performs the duty of a jack in presenting the boot-leg to the operation of the smoothing and finishing tool.

There are quite a number of stretching-machines that can be used with my mechanism; but I prefer to use that described in the patent granted to R. L. Lewis, and known as the "Howe" machine, although any tree may serve as a jack when provided with means at its end for turning the same to the operation of the tool.

The smoothing and finishing tool A, preferably made of hard wood, is represented in Fig. 2 as suspended over a jack, B; is provided with means for the adjustment above named in the horizontal, or substantially horizontal, frame C, which extends backward from the tool, and is pivoted at *c* to the swinging yoke D. This swinging yoke projects from the short shaft *d*, which is provided with bearings in the swinging frame E, itself suspended by the rods *e*, cross-bar *e'*, and staple $e^2$, from a hook, *f*, at the center of cross-bar F.

The shaft *d* communicates the power from the driven pulley G, operated by the belt *g*, to the pulley H, operating, through pulley I and the belt *h*, to revolve the smoothing and finishing tool. The tool or frame C is provided with the handles K.

Of course I do not confine myself to the exact construction and operation shown and described, but may use any mechanical substitute or equivalent for the parts named which will serve, as they do, in providing the smoothing and finishing tool with a revolving movement, with a horizontal adjustment in relation to the boot tree or jack, with a vertical adjustment in relation to the same, with a lateral movement in connection therewith, and with a vertical rocking, swiveling, or tipping movement at the center of its length, or with either of said movements or adjustments, or with combinations of two or more of them, as the case may be, in connection with a boot tree or jack provided with means for turning or partially turning the boot-leg in presenting it to the action of the tool. I prefer to make my tool somewhat concave, in order to better adapt it for operation on the convex surfaces of a boot-tree.

Operation: The boot, having been adjusted on the boot-tree in the ordinary way, is subjected to the action of the revolving tool, which, by the adjustments above named, can be brought to act on any portion of the boot-leg in removing wrinkles, in smoothing it on the tree, in rubbing in the filling material, and in otherwise finishing the leg.

The advantage of the machine is the ease and facility with which the boot-leg can be smoothed, fitted, and finished, as compared with the same manipulation when done by hand.

I am aware that the patent to White, granted March 12, 1872, Reissue No. 4,805, shows and describes a machine for rubbing out and rolling boot and shoe seams; also, that the patent to Thompson, of May 6, 1873, No. 138,713, shows and describes a device for rubbing down and rolling boot and shoe seams in combination with a device for stretching a boot-leg. The first-named apparatus has a reversible support for the boot or shoe; but this tool is provided only with a vertical yielding adjustment against the pressure of a spring. The other contrivance does not claim any special adjustability of either the tool or the support presenting the seam to the tool, and neither device shows a tool positively actuated. I do not claim anything elaborated in said patents, for my machine is intended to be used in smoothing out wrinkles in a boot-leg in fitting the same upon the boot-tree, and in rubbing in a filling and finishing composition, which is accomplished by a tool of a peculiar shape given peculiar adjustments in relation to a peculiar support or jack, and having a constant rotary movement.

It will be seen that in this machine the smoothing and finishing of the boot-leg upon the boot-tree is accomplished by the rolling action of the tool upon the boot-tree.

It will also be seen that said tool is positively actuated and constantly revolves when in operation.

It will be observed, further, that said tool is provided with a variety of adjustments in relation to the boot-tree, in order that it may work with uniformity and precision thereon when guided by the operator, that by said adjustments the tool can be caused to operate upon the upper surface of the boot-tree, upon the side of the boot-tree, upon the end portion thereof—in fact, upon any section where it may be desirable to smooth out wrinkles and rub in a filling composition—without causing the said boot-tree to rotate; but in some cases it is desirable that the said boot-tree be adapted to rotate in relation to the line of action of the tool.

It will be noticed that in operating this tool the same is guided upon the work by the handles, which enable the operator to turn the tool in almost any direction in relation to the boot-tree in performing its work.

I claim and desire to secure by Letters Patent of the United States—

1. In a machine for smoothing and finishing a boot-leg, the combination of a swinging frame suspended by a universal or other suitable joint, carrying driving and driven operating mechanism and supporting a swinging yoke, with the frame C, furnishing a bearing for the positively-actuated revolving tool A, and the tool-driving mechanism, all arranged to operate substantially as described.

2. In a machine for smoothing and finishing a boot-leg, the combination of the boot-tree with a positively-revolved smoothing and finishing tool, and the means for changing the relative position of tree and tool during the treeing process, whereby the boot is operated upon, smoothed, and finished in sections, substantially as and for the purposes described.

MARTIN V. B. ETHRIDGE.

Witnesses:
F. F. RAYMOND, 2d,
H. C. BURCH.